United States Patent [19]

Engel et al.

[11] Patent Number: 5,207,300
[45] Date of Patent: May 4, 1993

[54] HYDRAULIC, ADJUSTABLE VIBRATION DAMPER FOR MOTOR VEHICLES

[75] Inventors: Walter Engel, Windeck; Werner Sczepanski, Hennef, both of Fed. Rep. of Germany

[73] Assignee: BOGE Aktiengesellschaft, Eitorf, Fed. Rep. of Germany

[21] Appl. No.: 724,550

[22] Filed: Jun. 28, 1991

[30] Foreign Application Priority Data

Jun. 29, 1990 [DE] Fed. Rep. of Germany ....... 4020822

[51] Int. Cl.⁵ .......................... F16F 9/44; B60G 17/08
[52] U.S. Cl. ...................................... 188/299; 188/282; 188/319; 188/322.15
[58] Field of Search ............... 188/280, 282, 285, 299, 188/322.15, 319

[56] References Cited

U.S. PATENT DOCUMENTS

| | | | |
|---|---|---|---|
| 2,592,656 | 4/1952 | Catranis | 188/299 |
| 2,698,068 | 12/1954 | Hein | 188/299 |
| 3,256,960 | 6/1966 | Casimir | 188/299 |
| 4,683,992 | 8/1987 | Watanabe | 188/299 |
| 4,723,640 | 2/1988 | Beck | 188/319 |
| 4,850,460 | 7/1989 | Knecht et al. | 188/299 |
| 5,097,929 | 3/1992 | Spoto | 188/282 |

FOREIGN PATENT DOCUMENTS

| | | |
|---|---|---|
| 3303293 | 1/1984 | Fed. Rep. of Germany . |
| 3511169 | 10/1985 | Fed. Rep. of Germany ...... 188/299 |
| 3518327 | 11/1986 | Fed. Rep. of Germany . |

*Primary Examiner*—Matthew C. Graham
*Attorney, Agent, or Firm*—Nils H. Ljungman and Associates

[57] ABSTRACT

Hydraulic, adjustable vibration damper, such as for motor vehicles, in which, parallel to the damping valves, there is a bypass whose control body can be closed by a simple hydraulically or pneumatically pressurized adjustment apparatus, and opened by the internal system pressure of the vibration damper. For this purpose, the control body is equipped with a pressure intensifier, whereby on its external circumferential surface, an annular surface is created by a smaller-diameter portion for the application of the system internal pressure.

20 Claims, 5 Drawing Sheets

HYDRAULIC, ADJUSTABLE VIBRATION DAMPER FOR MOTOR VEHICLES

BACKGROUND OF THE INVENTION

1. Field of the Invention

The present invention relates to a hydraulic, adjustable vibration damper, such as for motor vehicles, with a damping piston fastened to a piston rod, which damping piston divides the work cylinder into two chamber halves filled with damping fluid, whereby there is at least one pressure controlled valve located in a bypass which runs parallel to the valves of the damping piston, and an adjustment apparatus pressurizes a control body to control the bypass.

2. Background Information

Federal Republic of Germany Laid Open Patent Application No. 33 03 293 describes damping force regulation devices for telescoping shock absorbers on which there is an additional double-acting damping valve, which is incorporated into the damping piston itself. These damping valves are connected in series and can be separated from one another by means of a rotary disc valve. In a first valve position, only the valve of the damping piston is carrying a flow, so that a hard damping action can be achieved. In a second valve position, the valve in the damping piston and the additional valve both carry flows, so that a correspondingly mild damping characteristic can be achieved.

A disadvantage with such an embodiment is that the rotary disk valve must be pressurized by appropriate adjustment forces which are applied by an electrically operated positioning motor.

The prior art also includes adjustable vibration dampers, for example, German Patent No. 35 18 327, in which there is a coil in the upper portion of the piston rod. An armature can be moved axially in the coil, and a defined bypass opening can be formed between the upper and lower work chamber as a function of the current applied to the coil. However, vibration dampers with a magnetic coil are expensive to manufacture.

OBJECT OF THE INVENTION

The object of the invention is to create a hydraulic, adjustable vibration damper in which the control body of a bypass can be closed by a simple hydraulically or pneumatically activated adjustment device, and opened by the internal system pressure of the vibration damper.

SUMMARY OF THE INVENTION

This object is achieved by the invention, in that the control body is pressured by a pressure medium. Between the pressure medium and the control body there is an axially movable pressure intensifier which is sealed on its circumference. The outer circumferential surface of the control body has a first diameter and a second, smaller diameter. The second, or step, diameter may be formed by turning the control body on a lathe during the manufacturing process.

An important feature of an embodiment of the present invention is that the bypass operates parallel to the conventional throttle valves in the damping piston. By means of an axially-moving controllable valve body, the bypass valve can be positioned with the valves of the damping piston, so that there is a larger correspondingly reduced throttle action, that is, damping. In this manner, different damping characteristics with the required extensive variability can be produced.

One advantage of this solution is that the expense of a magnetic coil in the vibration damper can be eliminated, and that the use of a control body which is moved by a pneumatically or hydraulically activated membrane can be achieved particularly easily in motor vehicles which are already equipped with a pneumatic suspension. For utility vehicles, which are increasingly equipped with a pneumatic suspension, the use of a pneumatically activated adjustment apparatus is also possible. The technical complexity and expense of the pneumatic activation of the adjustment apparatus is thereby relatively low. Such an adjustment apparatus can be easily incorporated in passenger automobiles with pneumatic or hydropneumatic suspension systems, as well.

As a result of the use of a sealed pressure intensifier, the adjustment apparatus can perform reliably even with moist and dirty compressed air, while still avoiding corrosion. The parts which come into contact with the moist and dirty compressed air, such as the internal hole of the piston rod and the sealed pressure intensifier, could be manufactured from corrosion resistant material, forming a self-enclosed chamber. The adjustment of the control body is accomplished by adding pressure to the adjustment apparatus. The return movement of the control body is accomplished by the internal system pressure of the vibration damper when the adjustment apparatus is depressurized.

According to another essential feature of the invention, the pressure intensifier has a vent on the side facing away from the pressure medium to prevent a distortion of the control pressure.

In a technically simple and effective embodiment, the pressure intensifier, or pressure transmitter, is an elastic membrane tightly clamped on its circumference. In this embodiment, the pressure medium is advantageously separated from the adjustment apparatus itself, so that any corrosion problems which are experienced are generally, insignificant.

To achieve possible optimal switching, or adjusting, processes of the control, or steering, body, a particularly favorable embodiment of the invention specifies that the control body has a smaller-diameter cylindrical extension on the side facing the membrane. The cylindrical extension, or branch, is advantageously located and sealed in a hole or boring. One embodiment of the invention specifies that the larger-diameter region of the control body has at least one hole connecting the front side to the back side.

One aspect of the invention resides broadly in a hydraulic vibration damper with a hydraulic cylinder filled with damping fluid, the vibration damper comprising: piston device comprising a piston fastened to a piston rod, the piston device being disposed in the hydraulic cylinder, the piston having valves, the piston dividing the cylinder into two chambers, the piston rod having a longitudinal axis: bypass apparatus disposed to bypass damping fluid about the valves of the piston device, the bypass apparatus having valve mechanisms, the valve mechanisms being disposed parallel to the valves of the piston, the valve mechanisms comprising at least one valve which is pressure-controlled by a pressure medium originating externally of the damper: the at least one externally pressure-controlled valve comprising an orifice for bypassing damping fluid and a movable body, the movable body being disposed for opening and closing the orifice during adjusting operation of the vibration damper: the movable body being moved by the pressure medium originating externally of the damper, the pressure medium for being controlled by external pressure adjustment device; apparatus for transmitting pressure disposed between the pressure medium and the movable body, the apparatus for transmitting pressure being axially movable in the piston device: and the movable body having an outer circumferential surface, the outer circumferential surface having a first diameter and a second diameter, the second diameter being smaller than the first diameter, the second diameter being disposed to cover the orifice of the bypass means.

Another aspect of the invention resides broadly in a hydraulic vibration damper with adjustable damping with a hydraulic cylinder filled with damping fluid, the vibration damper comprising: piston device comprising a piston fastened to a piston rod, the piston device being disposed in the hydraulic cylinder, the piston having valves, the piston dividing the cylinder into two chambers, the piston rod having a longitudinal axis; bypass apparatus disposed to bypass damping fluid about the valves of the piston device, the bypass apparatus having valve mechanisms, the valve mechanisms being disposed parallel to the valves of the piston, the valve mechanisms comprising at least one valve which is pressure-controlled: the at least one pressure-controlled valve comprising an orifice and a movable body, the movable body being disposed for opening and closing the orifice during adjusting operation of the vibration damper; and the movable body being pressurized by a pressure medium, the pressure medium originating external to the hydraulic cylinder; device for conducting pressure of the pressure medium, originating external to the hydraulic cylinder, to the movable body.

BRIEF DESCRIPTION OF THE DRAWINGS

Preferred embodiments of the invention are illustrated in the accompanying drawings.

DESCRIPTION OF THE PREFERRED EMBODIMENTS

Figure 1:
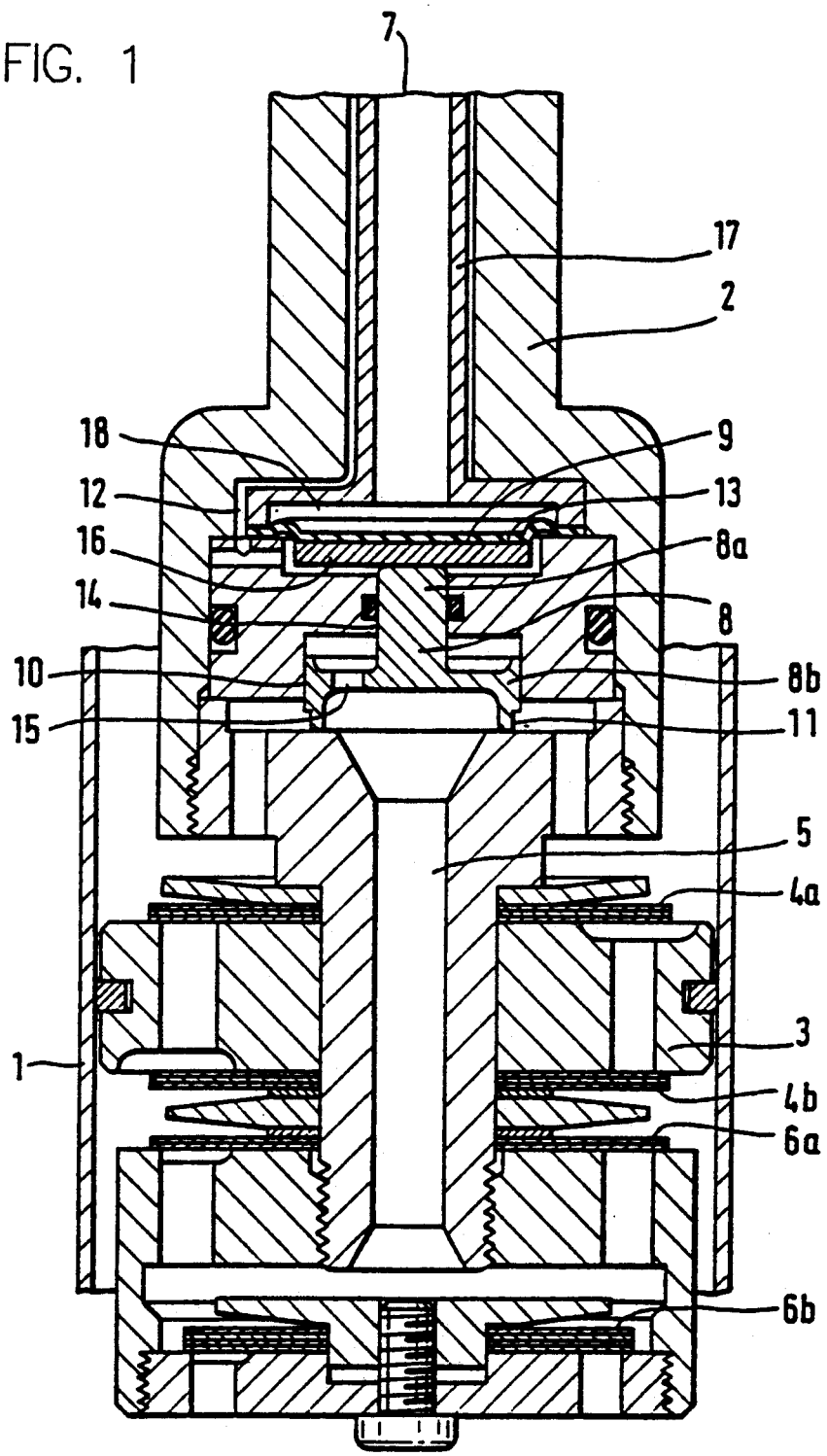
FIG. 1 shows a damping piston of a vibration damper with a detail of the adjustment apparatus in cross section.

The vibration damper illustrated in FIG. 1 consists essentially of a piston rod 2 and a damping piston 3, which separates a work cylinder 1 into an upper and a lower chamber half. The damping piston 3 is equipped with valves 4a and 4b to generate a damping force. The upper chamber half is also connected via a bypass 5 to the lower chamber half.

In the bypass 5, a passage is pressurized by an axially-movable control body 8, whereby the control body 8 is pressurized by a pressure medium, an adjustment apparatus 7 and a pressure intensifier, or transmitter 9. The pressure-controlled valves 6a and 6b are also located in the bypass 5. The pressure-controlled valves 6a and 6b preferably comprise valve spring washers.

In this embodiment, the pressure intensifier, or transmitter 9 is comprised of a membrane 13 and a reinforcement plate 16. A vent 12 generally makes certain that substantially no pressure can accumulate between the membrane 13 and the controllable valve body 8.

The air pressure necessary for the control is fed, or pushed into the expansion chamber 18 via a connection part which is pressed onto a corrosion-resistant plug-in, or insertable part 17. The connection part 17 is inserted in a hollow portion of the piston rod 2. Consequently, the membrane 13 moves downward and the movable control body 8 substantially closes the bypass 5. The damping medium now preferably flows only through the valves 4a and 4b, and a relatively high damping force is achieved.

Figure 1A:
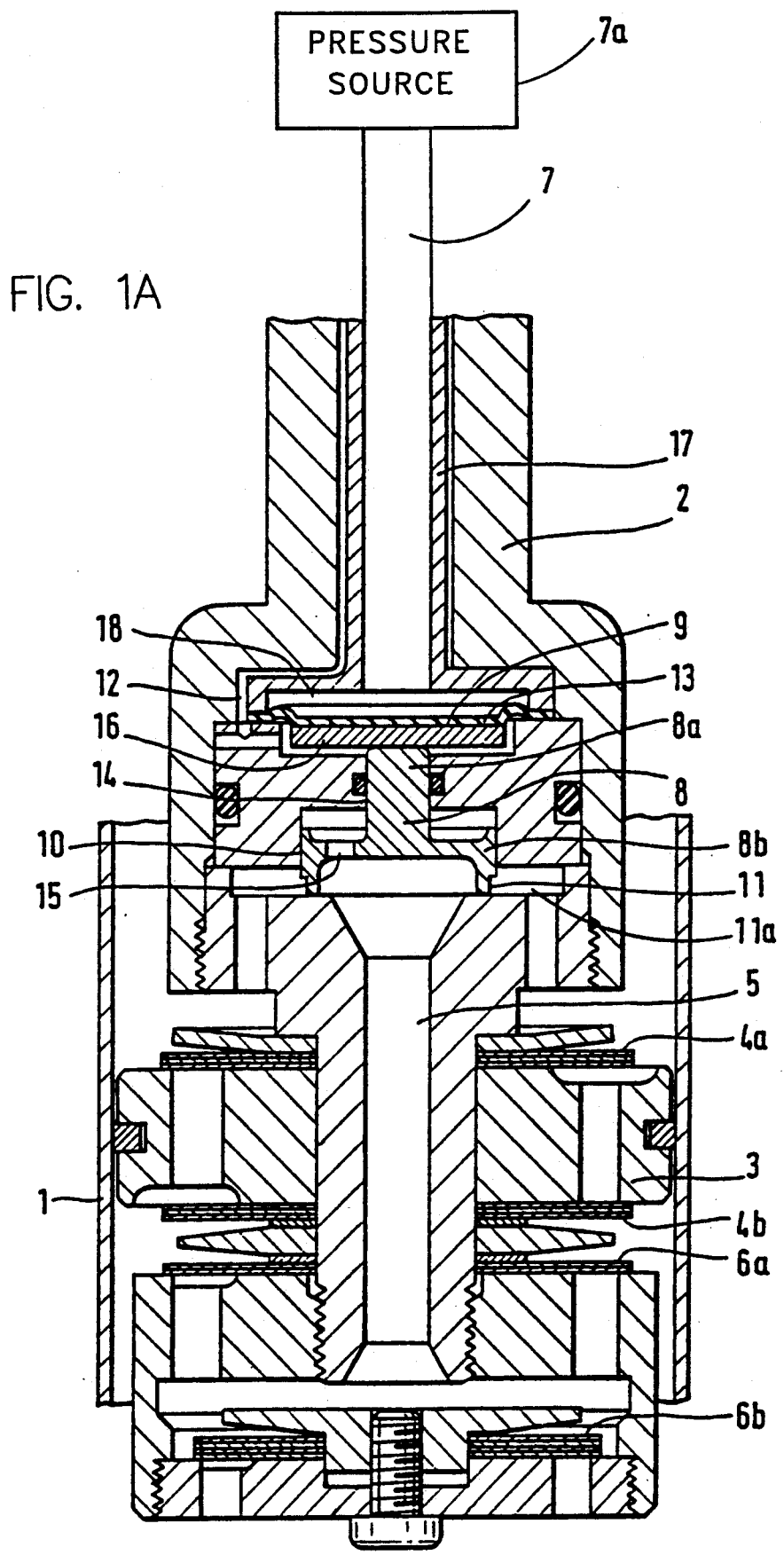
FIG. 1A is similar to FIG. 1, showing additional structures.

The return movement of the controllable valve body 8 of the bypass 5 is accomplished as follows: first the pressure medium to the membrane 13 is interrupted, and the control body 8 is pressurized via the smaller-diameter portion 11 on the external circumferential surface 10 in the decompression stage. As shown in FIG. 1A, chamber 11a is adjacent to the smaller-diameter portion 11 of the external circumferential surface 10, and chamber 11a is in communication with the upper chamber of work cylinder 1.

The pressure on the annular surface of the smaller-diameter portion 11 raises the movable control body 8. As a result of the pressure transmission to the entire surface of the control body 8b, the axially-movable control body 8 is fully raised. At this point, via the hole, or boring 15, both the forward end surface and the rear surface of the controllable valve body 8b are pressurized, whereby the cylindrical extension 8a of the control body 8 located in a hole, or boring 14 is not pressurized, on account of the seal. The result is a larger disk area ratio on the forward end surface, and the control body 8 can thus be raised.

When the axially-movable control body 8 is raised, the damping medium flows through the valves 4a and 4b, and also through the bypass 5, and thus through the pressure-controlled valves 6a and 6b. A soft damping force can be achieved by an appropriate configuration of these valves 6a and 6b.

In the embodiment of FIG. 1A, the external pressure source 7a is indicated. It is this external source of pressure which applies pressure to the pressure medium, thereby causing the diaphragm, or membrane 13 of the pressure transmitter 9 to effect a change in the position of the movable body 8, and consequently, to result in the damping of the vibration in the hydraulic cylinder.

Figure 2:
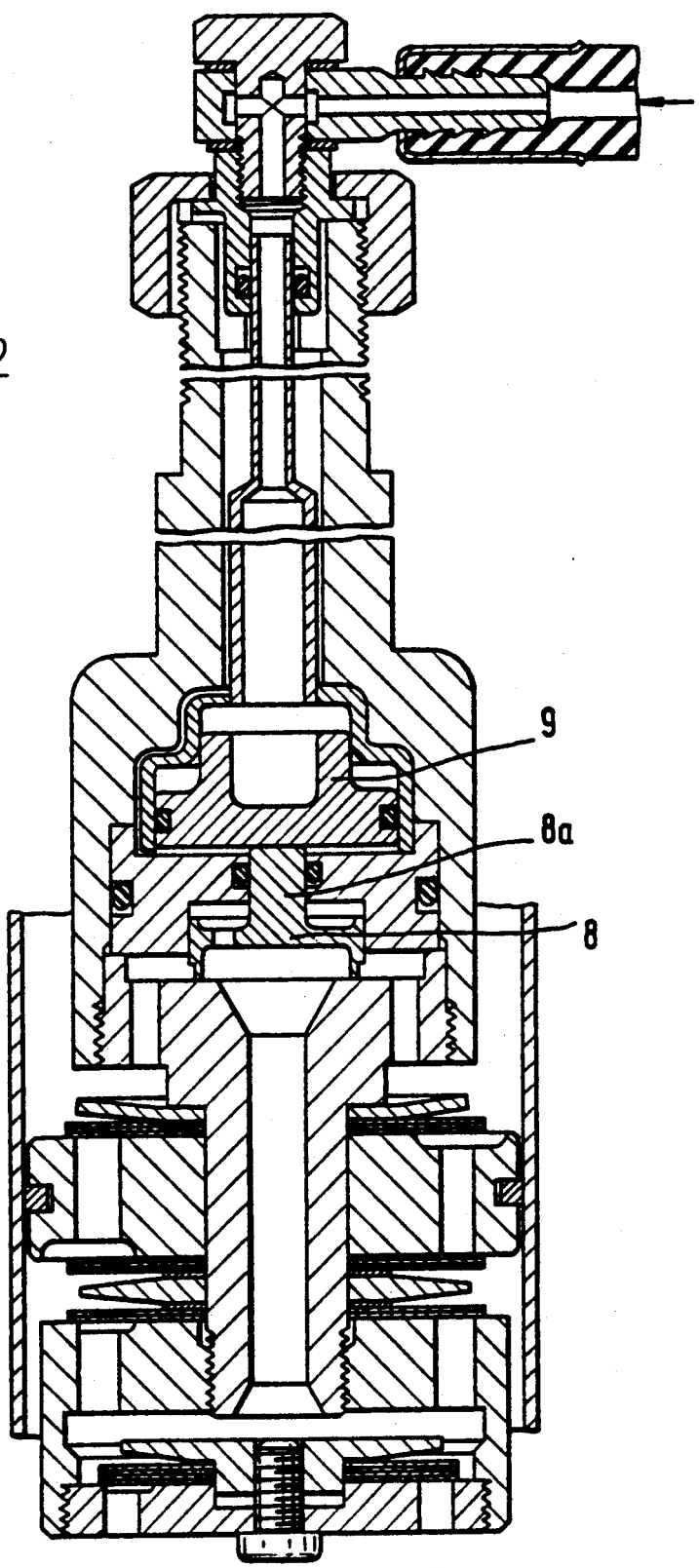
FIG. 2 shows an embodiment which is the same in principle as the embodiment in FIG. 1, but with a different pressure intensifier.

In the embodiment of FIG. 2, there is preferably a stationary, rigid, or fixed component as the pressure intensifier, or transferrer 9, which is preferably sealed axially, and also on its outside circumference.

In the embodiments of FIG. 1 and FIG. 2, the surfaces of the pressure translator, or intensifier 9 are designed in relation to the cylindrical branch or extension 8a of the control body 8 so that the adjustment force can be provided with an increase in pressure of approximately 5 bar. This operating pressure is generally available in pneumatic suspension systems of a motor vehicle.

Figure 3:
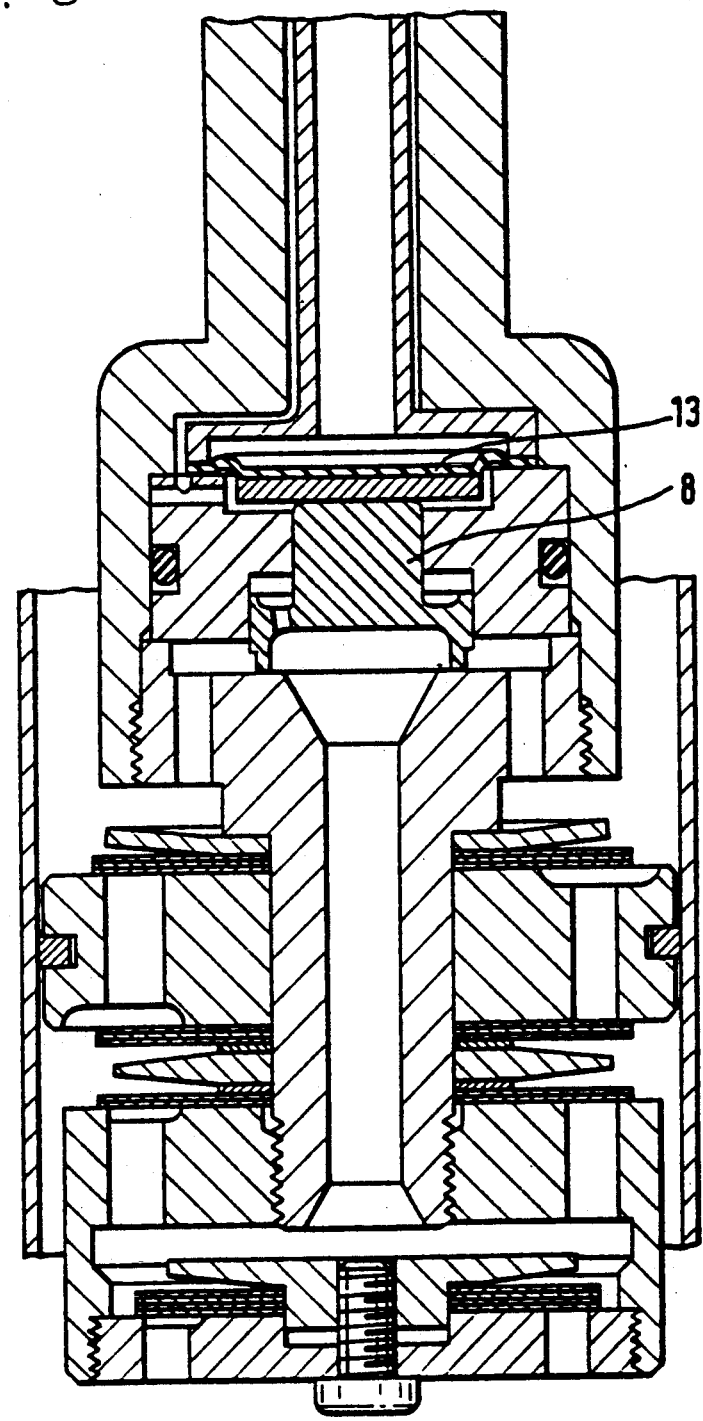
FIG. 3 shows a damping piston which is the same in principle as the embodiment in FIG. 1, but with different disk area ratios of the control body.

The embodiment of FIG. 3 shows a membrane 13 and a control body 8, in which the disk area ratios are more favorable for the opening of the control body 8. By means of a larger-diameter cylindrical extension 8a of the control body 8, it is easier to open the control body 8 by means of the system internal pressure. In this case, however, there must be a higher pressure of the adjustment apparatus available to close the control body 8.

Figure 4:
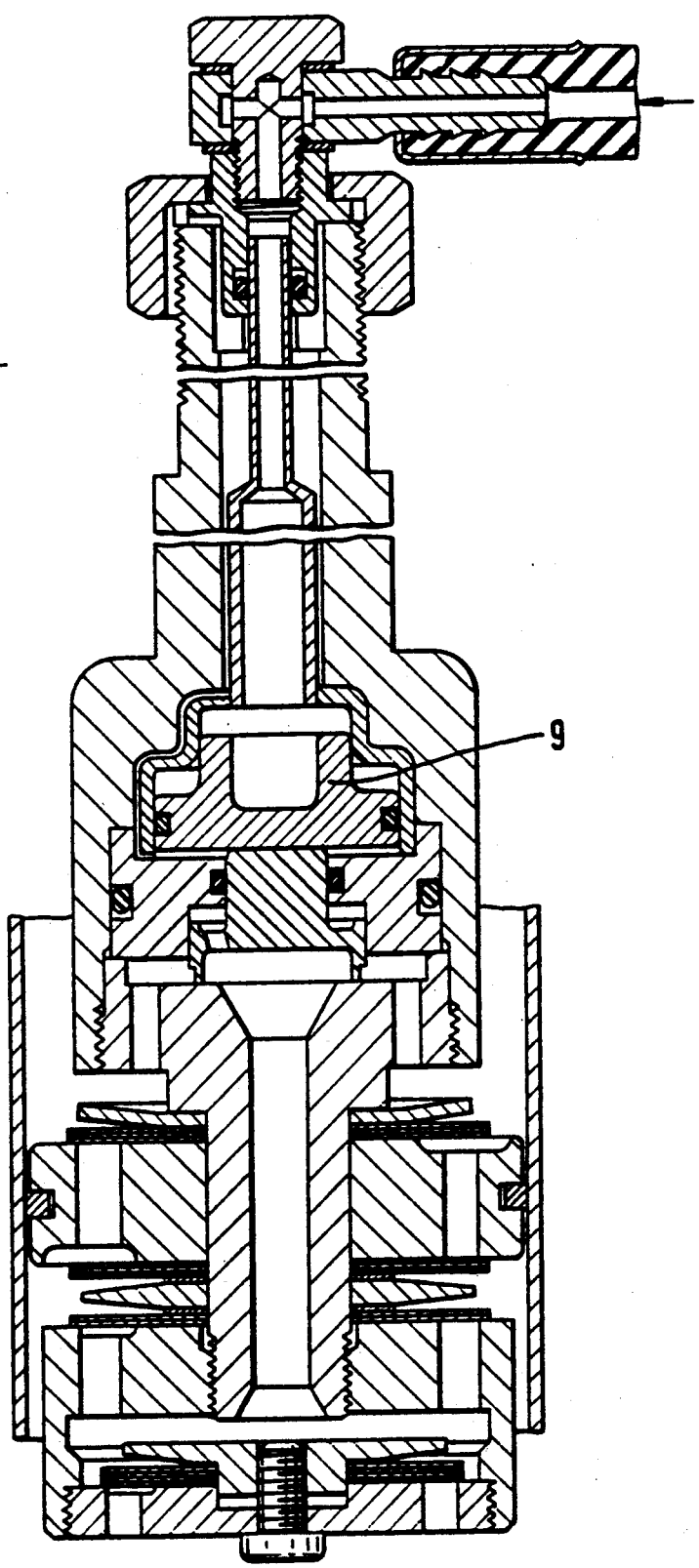
FIG. 4 shows a damping piston which is the same in principle as the one illustrated in FIG. 3, but with a different pressure intensifier.

The embodiment of FIG. 4 again shows the pressure intensifier, or transmitter 9 as a preferably, rigid component with a sealed outer circumference. The disk area ratios of the pressure intensifier 9 and of the movable control body 8 are similar to the embodiment illustrated in FIG. 3.

Possible examples of valve spring washers may be found in U.S. Pat. No. 4,723,640, issued on Feb. 9, 1988, entitled "Adjustable Hydraulic Vibration Damper," which is hereby incorporated herein as if set forth in its entirety.

In summary, one feature of the invention resides broadly in a hydraulic, adjustable vibration damper for motor vehicles, with a damping piston fastened to a piston rod, which damping piston divides the work cylinder into two chamber halves filled with damping fluid, whereby there is at least one pressure-controlled valve located in a bypass which runs parallel to the valves of the damping piston, and that an adjustment apparatus pressurizes a control body to control the bypass, characterized by the fact that the control body 8 is pressurized by means of a pressure medium, whereby between the pressure medium and the control body 8 there is an axially movable pressure intensifier 9 sealed on the circumference, and that the outer circumferential surface 10 of the control body 8 has a diameter 11 possibly formed by turning on a lathe.

Another feature of the invention resides broadly in a vibration damper which is characterized by the fact that the pressure intensifier 9 has a vent 12 on the side facing away from the pressure medium.

Yet another feature of the invention resides broadly in a vibration damper which is characterized by the fact that the pressure intensifier 9 is an elastic membrane 13 which is tightly clamped on the circumference.

Still another feature of the invention resides broadly in a vibration damper which is characterized by the fact that the control body 8 has a smaller-diameter cylindrical extension 8a on the side facing the membrane 13.

Another feature of the invention resides broadly in a vibration damper which is characterized by the fact that the cylindrical extension 8a is sealed in a hole 14.

Yet another feature of the invention resides broadly in a vibration damper which is characterized by the fact that the larger-diameter region of the control body 8b has at least one hole 15 connecting the front side with the back side.

All, or substantially all, of the components and methods of the various embodiments may be used with at least one embodiment or all of the embodiments, if any, described herein.

All of the patents and publications recited herein are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A hydraulic vibration damper with adjustable damping with a hydraulic cylinder filled with damping fluid, said vibration damper comprising:

piston means comprising a piston fastened to a piston rod, said piston means being disposed in said hydraulic cylinder, said piston having valves, said piston dividing said cylinder into two chambers, said piston rod having a longitudinal axis;

bypass means disposed to bypass damping fluid about said valves of said piston means, said bypass means having valve means, said valve means being disposed parallel to said valves of said piston, said valve means comprising at least one valve which is pressure controlled by a pressure medium originating externally of the vibration damper;

means for providing said external pressure medium to said valve means;

said at least one externally pressure-controlled valve comprising an orifice and a movable body, said movable body being disposed for opening and closing said orifice for bypassing damping fluid during adjusting operation of said vibration damper;

said movable body being movable by said external pressure medium, said external pressure medium for being controlled by external pressure adjustment means;

means for transmitting pressure disposed between said external pressure medium providing means and said movable body, said means for transmitting pressure being movable in said piston means;

said movable body having an outermost circumferential surface;

said outermost circumferential surface having a first outer cylindrical portion and a second outer cylindrical portion;

said first outer cylindrical portion having a first diameter;

said second outer cylindrical portion having a second diameter;

said second diameter being smaller than said first diameter;

said first outer cylindrical portion and second outer cylindrical portion being coaxial;

at least a portion of said second outer cylindrical portion not being overlapped by any portion of said first outer cylindrical portion;

said first outer cylindrical portion being disposed between said means for transmitting pressure and said at least a portion of said second outer cylindrical portion;

said second outer cylindrical portion being configured to be selectively disposable to open and close said orifice;

said outermost circumferential surface having a third outer portion;

said third outer portion joining said first outer cylindrical portion and said second outer cylindrical portion;

said third outer portion being configured to be acted upon by pressure from the damping fluid to assist in opening said orifice; and means for guiding said first outer cylindrical portion by said first outer cylindrical portion slidably moving within said means for guiding to thereby permit opening and closing of said orifice.

2. The hydraulic vibration damper according to claim 1, wherein said movable body is disposed to permit flow through said orifice when said means for transmitting pressure is compressed.

3. The hydraulic vibration damper according to claim 1, wherein said third outer portion comprises an annular surface extending from said second outer cylindrical portion to said first outer cylindrical portion.

4. The hydraulic vibration damper according to claim 3, wherein said third outer portion comprises an annular surface extending radially from said second outer cylindrical portion to said first outer cylindrical portion.

5. The hydraulic vibration damper according to claim 4, wherein said first diameter and said second diameter are substantially similar.

6. The hydraulic vibration damper according to claim 5, wherein said at least one externally pressure-controlled valve comprises solely one externally pressure-controlled valve;
said movable body is the sole movable body of said externally pressure-controlled valve; and
said orifice is the sole orifice, which is closed and opened, of said externally pressure-controlled valve.

7. The hydraulic vibration damper according to claim 5, wherein said means for transmitting pressure is a rigid component, said rigid component having a circumference, said rigid component being sealed axially and around said circumference.

8. The hydraulic vibration damper according to claim 6, wherein said means for transmitting pressure has a first side and a second side, said first side being disposed towards said external pressure medium, said second side being disposed away from said external pressure medium, said means for transmitting pressure having a vent disposed on said second side.

9. The hydraulic vibration damper according to claim 8, wherein said means for transmitting pressure is an elastic membrane, said elastic membrane having a sealed circumference; and
said movable body has a cylindrical extension, said cylindrical extension having a diameter, said diameter of said cylindrical extension being smaller than said second diameter of said movable body, said cylindrical extension being disposed toward said elastic membrane.

10. The hydraulic vibration damper according to claim 9, wherein said piston rod has a hole, said cylindrical extension being sealed in said hole;
said movable body has a front side and a back side, said front side being disposed between said back side and said means for transmitting pressure; and
a boring is disposed in a portion of said movable body having said first diameter, said boring connecting said front side of said movable body to said back side of said movable body.

11. The hydraulic vibration damper according to claim 10, wherein said second outer cylindrical portion has a first circular edge and a second circular edge;
said third outer portion extends from said first circular edge;
said movable body has a fourth annular surface;
said fourth annular surface has a third outer circular edge and a fourth inner circular edge;
said third outer circular edge has a third diameter;
said fourth inner circular edge has a fourth diameter;
said fourth diameter is smaller than said third diameter; and
said third outer edge coincides with said second circular edge of said second outer cylindrical portion.

12. The hydraulic vibration damper according to claim 11, wherein said movable body has a fifth concave surface;
said fifth concave surface has a fifth circular edge;
said fifth circular edge coincides with said fourth inner circular edge;
said fifth concave surface has a portion adjacent to said fifth circular edge and a portion not adjacent to said fifth circular edge;
said portion of said fifth concave surface adjacent to said fifth circular edge is cylindrical and is coaxial with said first outer cylindrical portion;
said first outer cylindrical portion has a longitudinal axis; and
said portion of said fifth concave surface not adjacent to said fifth circular edge is transverse to said longitudinal axis of said first outer cylindrical portion.

13. The hydraulic vibration damper according to claim 12, wherein said means for guiding comprises a tenth concave cylindrical surface in said piston rod;
said tenth concave cylindrical surface is coaxial with said first outer cylindrical portion;
said tenth concave cylindrical surface has a tenth circular edge and an eleventh circular edge, said tenth circular edge being disposed between said means for transmitting pressure and said eleventh circular edge;
said piton rod comprises a twelfth annular surface;
said twelfth annular surface has a twelfth inner circular edge and a thirteenth outer circular edge;
said twelfth inner circular edge has a twelfth diameter;
said thirteenth outer circular edge has a thirteenth diameter;
said twelfth diameter is smaller than said thirteenth diameter;
said twelfth inner circular edge coincides with said eleventh circular edge;
said piston rod comprises a fourteenth concave cylindrical surface;
said fourteenth concave cylindrical surface is coaxial with said first outer cylindrical portion;
said fourteenth concave cylindrical surface has a fourteenth circular edge and an fifteenth circular edge, said fourteenth circular edge being disposed between said means for transmitting pressure and said fifteenth circular edge;
said thirteenth outer circular edge coincides with said fourteenth circular edge;
said piston rod comprises a sixteenth annular surface;
said sixteenth annular surface has a sixteenth outer circular edge and a seventeenth inner circular edge;
said sixteenth outer circular edge has a sixteenth diameter;
said seventeenth inner circular edge has a seventeenth diameter;
said seventeenth diameter is smaller than said sixteenth diameter;
said sixteenth outer circular edge coincides with said fifteenth circular edge;
said orifice has a first end and a second end, said first end of said orifice being disposed between said means for transmitting pressure and said second end of said orifice; and said first end of said orifice coincides with said seventeenth inner circular edge.

14. The hydraulic vibration damper according to claim 13, wherein said seventeenth diameter is smaller than said fourth diameter;
said fourth annular surface is planar; and
said sixteenth annular surface is planar.

15. The hydraulic vibration damper according to claim 14, wherein said movable body is disposable to a closed position in which said orifice is closed;
in said closed position:
said fourth annular surface is sealed against said sixteenth annular surface;
said first outer cylindrical portion is sealed against said tenth concave cylindrical surface;
said sixteenth annular surface comprises an outer portion extending from said third outer circular edge to said sixteenth outer circular edge and an inner portion extending from said fourth inner circular edge to said seventeenth inner circular edge;
said piston rod comprises a first subchamber and a second subchamber,
said first subchamber having walls,
said walls of said first subchamber comprising said twelfth annular surface, said fourteenth concave cylindrical surface, said outer portion of said sixteenth annular surface, said second outer cylindrical portion and said third outer portion,
said second subchamber having walls, and
said walls of said second subchamber comprising said fifth concave surface and said inner portion of said sixteenth annular surface;
said second subchamber is in communication with said orifice; and
said second subchamber and said orifice are blocked from communicating with said first subchamber by said fourth annular surface being sealed against said sixteenth annular surface and said first outer cylindrical portion being sealed against said tenth concave cylindrical surface;
said two chambers of said hydraulic cylinder comprise an upper chamber and a lower chamber, said upper chamber having a length along the longitudinal axis of said piston rod, and said piston rod traversing the entire length of said upper chamber;
said piston rod comprises at least one bore between said upper chamber and said outer portion of said sixteenth annular surface, said first subchamber communicating with said upper chamber through said at least one bore;
said movable body is disposable to an open position in which said orifice is opened; and
in said open position:
said movable body is disposed such that there is space between said fourth annular surface and said sixteenth annular surface;
said piston rod comprises a third subchamber, said third subchamber having walls, and
said walls of said third subchamber comprising said twelfth annular surface, said fourteenth concave cylindrical surface, said sixteenth annular surface, said fifth concave surface, said fourth annular surface, said second outer cylindrical portion and said third outer portion; and
said orifice is in communication with third subchamber, said at least one bore, and said upper chamber.

16. The hydraulic vibration damper according to claim 15, wherein said orifice comprises a first end section and a second central section, said second central section being cylindrical, said second central section having a diameter which diameter is smaller than said seventeenth diameter, said first end section being conical, and said first end section extending from said first end of said orifice to said second central section.

17. The hydraulic vibration damper according to claim 16, wherein said bypass means further comprise pressure-dependent, biased valve means, said pressure-dependent, biased valve means being disposed in series with said at least one externally pressure-controlled valve;
said pressure-dependent, biased valve means comprise spring-loaded valve means, said spring-loaded valve means having at least one throttle opening and at least one valve spring washer being biased and disposed such that said at least one throttle opening is normally in a first, closed seated position at no pressure difference thereacross;
said spring-loaded valve means comprises at least one other valve seat for limiting opening movement of said valve spring washer thereagainst for stopping flow through said bypass means after said valve spring washer has made a predetermined excursion under pressure, said valve spring washer being bendable from said first seated position to a second seated position against said at least one other valve seat under pressure; and
said at least one throttle opening and said at least one valve spring washer are disposed to open at given pressures during decompression and compression.

18. The hydraulic vibration damper according to claim 17, further comprising an expansion chamber, said expansion chamber being disposed between said elastic membrane and said external pressure medium;
wherein said means for transmitting pressure further comprises a reinforcement plate.

19. The hydraulic vibration damper according to claim 18, wherein an insert is disposed within said piston rod, said insert being substantially non-corrosive;
said means for transmitting pressure is substantially non-corrosive;
wherein said bypass means further comprises, in series with said pressure-dependent, biased valve means and said externally pressure-controlled valve means, at least one first opening having a longitudinal axis aligned with said piston rod longitudinal axis; and
said sealed circumference of said means for transmitting pressure is annular.

20. A hydraulic vibration damper with adjustable damping with a hydraulic cylinder filled with damping fluid, said vibration damper comprising:
piston means comprising a piston fastened to a piston rod, said piston means being disposed in said hydraulic cylinder, said piston having valves, said piston dividing said cylinder into two chambers, said piston rod having a longitudinal axis;
bypass means disposed to bypass damping fluid about said valves of said piston means, said bypass means having valve means, said valve means being disposed parallel to said valves of said piston, said valve means comprising at least one valve which is pressure-controlled;

said at least one pressure-controlled valve comprising an orifice and a movable body, said movable body being disposed for opening and closing said orifice during adjusting operation of said vibration damper;

said movable body being pressurized by a pressure medium, said pressure medium originating external to the hydraulic cylinder;

means for conducting pressure of said pressure medium, originating external to the hydraulic cylinder, to said movable body;

said movable body having an outermost circumferential surface;

said outermost circumferential surface having a first outer cylindrical portion and a second outer cylindrical portion;

said first outer cylindrical portion having a first diameter;

said second outer cylindrical portion having a second diameter;

said second diameter being smaller than said first diameter;

said first outer cylindrical portion and second outer cylindrical portion being coaxial;

at least a portion of said second outer cylindrical portion not being overlapped by any portion of said first outer cylindrical portion;

said first outer cylindrical portion being disposed between said means for conducting pressure and said at least a portion of said second outer cylindrical portion;

said second outer cylindrical portion being configured to be selectively disposable to cover said orifice;

said outermost circumferential surface having a third outer portion;

said third outer portion comprising an annular surface extending from said second outer cylindrical portion to said first outer cylindrical portion;

said third outer portion being configured to be acted upon by pressure from the damping fluid to assist in opening said orifice; and means for guiding said first outer cylindrical portion by said first outer cylindrical portion slidably moving within said means for guiding to thereby permit opening and closing of said orifice.

* * * * *

UNITED STATES PATENT AND TRADEMARK OFFICE
CERTIFICATE OF CORRECTION

PATENT NO. : 5,207,300
DATED : May 4, 1993
INVENTOR(S) : Walter ENGEL and Werner SCZEPANSKI It is certified that error appears in the above-indentified patent and that said Letters Patent is hereby corrected as shown below:

In column 7, line 26, Claim 7, before 'wherein', delete "5," and insert --8,--.

In column 8, line 30, Claim 13, after 'said', delete "piton" and insert --piston--.

Signed and Sealed this

Fifth Day of November, 1996

Attest:

BRUCE LEHMAN

Attesting Officer      Commissioner of Patents and Trademarks